Feb. 4, 1969 L. H. RUHNKE 3,426,280
APPARATUS FOR MEASURING THE POTENTIAL GRADIENT IN THE ATMOSPHERE
Filed Oct. 9, 1964
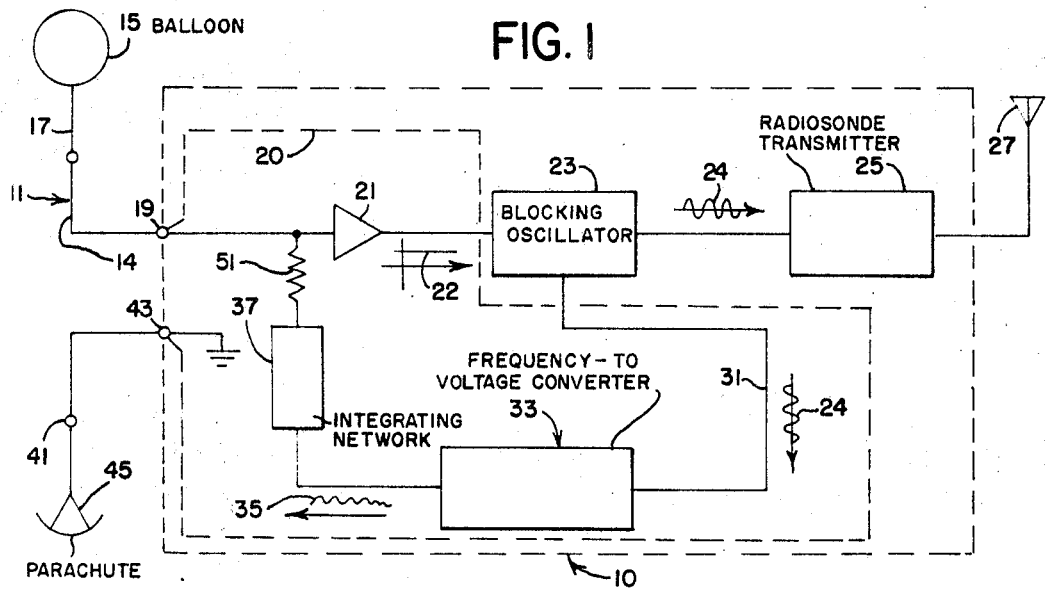
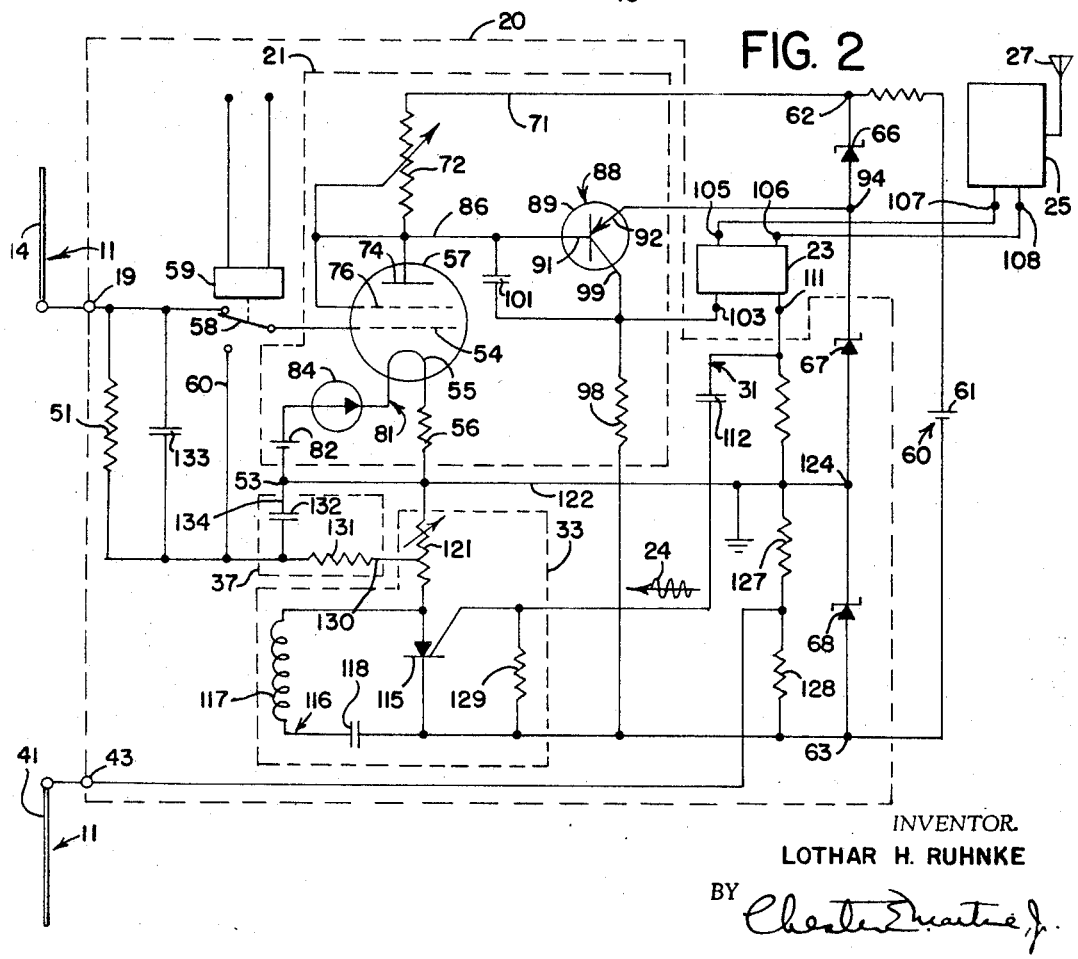
INVENTOR.
LOTHAR H. RUHNKE
BY *Chester Truante Jr.*
ATTORNEY

United States Patent Office 3,426,280
Patented Feb. 4, 1969

3,426,280
APPARATUS FOR MEASURING THE POTENTIAL
GRADIENT IN THE ATMOSPHERE
Lothar H. Ruhnke, Minneapolis, Minn., assignor to Litton
Systems, Inc., Beverly Hills, Calif.
Filed Oct. 9, 1964, Ser. No. 402,902
U.S. Cl. 325—113                     6 Claims
Int. Cl. H04b 1/02, 1/04; H03f 1/30

ABSTRACT OF THE DISCLOSURE

The invention relates to an instrument for measuring atmospheric current density which is adapted for atmospheric flight and has a dipole antenna for collecting currents across the terminals thereof which are indicative of atmospheric currents.

The instrument includes amplifier means for generating a D.C. voltage proportional to the current developed across the antenna terminals, a blocking oscillator which generates A.C. voltages having frequencies dependent upon input D.C. voltages, and a radiosonde transmitter for telemetering the signals of the blocking oscillator to a remote location.

The instrument also includes, as a novel feature, a feedback circuit between the blocking oscillator and the antenna terminals to provide a differential input voltage for the amplifier to lower the effective input impedance of the instrument and provide linearity and stability.

---

This invention relates to measuring instruments and more particularly to improved instruments which may be carried into the atmosphere for measuring the atmospheric air-earth current density.

It has been known for several hundred years that the earth carries a negative electrical charge and the atmosphere a positive charge. Since the atmosphere is not a perfect insulator, a conduction current flows in the atmosphere, carrying positive charges downward to the earth. By lightning and point discharge, thunderstorms reverse the direction of current flow, carrying negative charges to earth and positive charges to the upper atmosphere. Ionization of the upper atmosphere by cosmic rays and other fast-moving particles produces positively and negatively charged particles which support the flow of air-earth current. World-wide air-earth current has been estimated at 1800 amperes. The corresponding current density is of the order of micro-micro amperes per square meter.

In the past, measuremnts of air-earth current were made at ground level by such methods as collecting the atmospheric charge on large metal plates mounted flush with and insulated from the earth. Also, the current at various altitudes has been measured indirectly by measuring the positive and negative atmospheric conductivity and also the potential gradient by means of separate airborne instruments. The total conductivity is then obtained as the sum of the positive and negative conductivities. The current density is then calculated as the product of conductivity and potential gradient.

More recently, radiosondes have been developed for airborne atmospheric electric investigations. Initially, these radiosondes utilized electrometers provided with inverted triodes for measuring atmospheric potential gradients. Such triodes are responsive only to positive voltages, however, and when operated over relatively long periods of time at low temperatures, neither the filament nor the grid supply voltages are sufficiently stable to take drift of the zero point or of sensitivity into account during preflight calibrations.

Later, two-stage electrometer amplifiers were used with radioactive probes for electric field measurements. To avoid saturation of the input tube, however, a supply voltage of over 400 volts and strong feedback currents were used in such two-stage electrometers. For long flights, considerations of weight and temperature preclude the use of high voltage batteries necessary to generate such high supply voltages.

Other electrometers have been developed for current measurements and utilized circuits including a first transistor as a second stage amplifier after an electrometer tube. Modulation of a blocking oscillator is achieved by a second transistor. It has been found, however, that the linearity and stability of such circuits are not suitable for sensing atmospheric electricity during relatively long flights at low ambient temperatures.

More recently, electrometers using a 3-stage, D.C. amplifier have been developed for air conductivity meansurements. In such amplifiers, the output voltage is fed back over a high value resistor to the input. This stabilizes the amplifier, but has no effect on radiosonde telemetering equipment operated by the amplifier, hence, the conductivity measurement system as a whole, is still subject to the instability and nonlinearity of the radiosonde telemetering equipment. Moreover, such circuits require four batteries, hence, considerations of weight limit their usefulness for relatively long flights.

The limitations of such prior radiosonde and electrometer units impair their usefulness in measuring current density in the atmosphere over relatively long flight periods using constant-level balloons. Moreover, when the total weight of current density measuring instruments must be less than 6 pounds, for example, to preclude violation of certain aviation regulations, heavy power supplies and thermal shielding cannot be used. Such weight limitations further preclude the use of equipment to heat the measuring instrument.

Research conducted in an endeavor to provide an improved instrument for measuring atmospheric air-earth current density indicates that high stability and linearity may be achieved while minimizing weight by providing a frequency feedback loop from a radiosonde blocking oscillator to the input of an electrometer. A frequency-to-voltage converter included in the feedback loop permits compensation for irregularities of both the blocking oscillator and a final amplification stage of the electrometer so that high stability and linearity are achieved.

An object of the present invention is to provide a new and improved measuring instrument.

Another object of the present invention is to provide a new and improved instrument which may be carried into the atmosphere for measuring the atmospheric air-earth current density.

Still another object of the present invention resides in the provision of a frequency feedback loop from a radiosonde blocking oscillator to the input of an electrometer for rendering an atmospheric current-density measuring instrument linear and stabile.

A further object of the present invention is to provide a new and improved stabilized current for an electrometer tube of an atmospheric current-density measuring instrument.

A still further object of the present invention resides in the provision of a frequency feedback loop including a frequency-to-voltage converter for converting an alternating output signal to a feedback voltage signal to control an atmospheric current-density measuring instrument.

These and other objects will become apparent from the following detailed description when considered in conjunction with the accompanying drawings, wherein:

FIGURE 1 is a schematic drawing of an improved instrument for measuring atmospheric air-earth current density according to the principles of the present invention, and FIGURE 2 is a circuit diagram of the measuring instrument shown in FIGURE 1 illustrating a frequency feedback loop from a radiosonde blocking oscillator to the input of an electrometer for rendering the measuring instrument linear and stabile.

Referring now to FIGURE 1 of the drawings, there is shown a radiosonde unit 10 provided with a dipole antenna 11 for sensing atmospheric air-earth current density. An upper dipole 14 may be suspended from a balloon 15, for example, by an insulated nylon cord 17 which is sufficiently long to isolate the radiosonde unit 10 from the influence of any static charge acquired by the balloon 15. The upper dipole 14 is connected to an input terminal 19 of a measuring instrument 20 which includes a two-stage electrometer amplifier 21 for generating a D.C. voltage signal 22 which frequency-modulates a blocking oscillator 23 of a radiosonde transmitter 25. The blocking oscillator 23 generates an alternating voltage signal 24 having a frequency dependent upon the D.C. voltage signal 22. The signal 24 of the blocking oscillator 23 is telemetered by the radiosonde transmitter 25 to a remote location via an antenna 27.

The alternating voltage signal 24 of the blocking oscillator 23 is also fed back along a feedback circuit 31 to a frequency-to-voltage converter 33 which produces a D.C. feedback voltage signal 35 which is proportional to the frequency of the alternating voltage signal 24. A network 37 smoothes the feedback voltage signal 35 prior to application thereof over a feedback resistor 51 to the electrometer amplifier 21.

The feedback voltage signal 35 renders the measuring instrument 20 stabile and linear by compensating for the irregularities of the blocking oscillator 23 as well as those of the electrometer amplifier 21. A lower dipole 41 is connected to a second terminal 43 of the measuring instrument 20 and is held vertical by an inverted parachute 45, for example.

Referring now to FIGURE 2, the measuring instrument 20 is shown provided with the terminals 19 and 43 connected to the respective upper and lower dipoles 14 and 41 of the dipole antenna 11. The dipoles 14 and 41 may each consist of silver coated nylon cord having a static strength of 50 pounds, for example.

When the instrument 20 is airborne, the upper dipole 14 collects a positive charge and the lower dipole 41 collects a negative charge according to the amount of the effective volume of the dipole antenna 11, which amount may be calculated by one skilled in the art by reference, for example, to the H. W. Kasemir Patent 3,121,196, issued Feb. 11, 1964.

The positive and negative charges provide an input current flowing through the terminals 19 and 43 and across the feedback resistor 51. A differential voltage equal to the difference between the voltage drop produced by the input current flowing across the resistor 51 and the feedback voltage provided by the D.C. feedback voltage signal 35 is applied across a grid 54 and a filament 55 of an electrometer tube 57 of the electrometer amplifier 21. The differential voltage is very small, such as one mv., for example, because the D.C. feedback voltage 35 and the product of the input current and the resistance of the resistor 51 are almost equal.

The electrometer amplifier 21 includes the electrometer tube 57 which may be a direct heated pentode, such as a type CK 5886 tube, having the grid 54 connected through an arm 58 of a relay 59 to the terminal 19 and to the resistor 51. The relay 59 may be energized for moving the arm 58 to connect a conductor 60 to the grid 54 to provide a zero check.

A voltage supply 60 for the tube 57 is provided by a battery, such as a lightweight, 28 volt, mercury battery 61. The battery 61 is connected to terminals 62 and 63 of three series connected Zener diodes 66, 67 and 68. The Zener diodes 66–68 are effective to stabilize the voltage supply 60 by limiting the voltage change across any Zener diode to 1/10 of 1% of the voltage change of the battery 61, hence, the voltage supply 60 is stabilized. A conductor 71 connected to the terminal 62 applies a voltage across a variable resistor 72 for supplying voltage to a plate 74 and to a screen grid 76 of the tube 57.

A stabilized filament current supply 81 is provided for the electrometer tube 57 by a battery, such as a lightweight, 6.25 volt, nickel-cadmium battery 82 connected to a solid state current regulator device 84, such as a type CP5 "Currector" sold by the Circuit Dyne Corporation. The current regulator device 84 is connected to the filament 55 for limiting the filament current to a constant valve, such as 10 ma., for example. A temperature sensitive resistor 56 connected to the filament 55 compensates the filament current for temperature drifts which are not compensated by the feedback circuit 31. Also, the temperature sensitive resistor 56 biases the electrometer tube 57 into a region where the grid current is lowest.

The differential voltage applied across the grid 54 and the filament 55 is amplified by the electrometer tube 57 and is applied by a conductor 86 to a transistor amplifier 88 which provides a second amplification stage of the electrometer amplifier 21. The transistor amplifier 88 includes a transistor 89, such as a type 2N604 germanium transistor, for example, having a base 91 connected to the conductor 86. An emitter 92 of the transistor 89 is biased by a voltage applied from a terminal 94 between the Zener diodes 66 and 67.

The amplified differential voltage is applied by the conductor 86 to the base 91 for further amplification by the transistor 89 and appears as an output voltage over a load resistor 98 connected to a collector 99 of the transistor 89. A capacitor 101 is connected between the conductor 86 and the collector 99 so that the transistor 89 operates as a feedback amplifier if the output voltage alternates. Thus, the capacitor 101 is effective to dampen to zero the amplification of alternating voltages applied to the base 91.

The output voltage is applied to an input terminal 103 of the blocking oscillator 23 which is responsive to the output voltage for generating a series of pulses which form the alternating voltage signal 24. In response to the output voltage, the frequency of the alternating voltage signal 24 generated by the blocking oscillator 23 varies within a range between 0 and 200 cps., for example. In a standard manner, the signal 24 is applied from terminals 105 and 106 to terminals 107 and 108 of the radiosonde transmitter 25. The radiosonde transmitter 25 may be a standard AN/AMT-4 radiosonde which includes the blocking oscillator 23 and telemeters the alternating voltage signal 24 to a receiver, such as a ground based receiver (not shown), located remotely from the airborne measuring instrument 20.

The feedback circuit 31 is connected to a terminal 111 of the blocking oscillator 23 for applying the alternating voltage signal 24 across a coupling capacitor 112 to the frequency-to-voltage converter 33. The feedback circuit 31 may also be connected to terminals 105 or 106 of the blocking oscillator 23 inasmuch as the alternating voltage signal 24 also appears at such terminals.

The frequency-to-voltage converter 33 includes a switch, such as a silicon controlled switch 115 which is normally open for conditioning a resonant circuit 116 for operation. The resonant circuit 116 includes an inductive coil 117 and a capacitor 118 ocnnected in series across the silicon controlled switch 115. The switch 115 and the oil 117 are connected to a resistor 121 which is connected by a conductor 122 to a terminal 124 between the Zener diodes 67 and 68. When the silicon controlled switch 115 is open, the capacitor 118 is charged by a circuit which may be traced from the terminal 124, through the conductor 122, through the resistor 121 and through the coil 117 to the capacitor 118.

In response to a pulse of the series of pulses of the alternating voltage signal 24, the silicon controlled switch 115 is triggered and conducts. At this time, the capacitor 118 discharges through the coil 117 and through the silicon controlled switch 115 and causes the Zener voltage across the terminals 63 and 124 to appear as an initial voltage pulse across the resistor 121. As the capacitor 118 discharges, a field builds up in the coil 117. When the capacitor 118 is fully discharged, the field collapses and charges the capacitor 118 oppositely. When the field is fully collapsed, the capacitor 118 initially discharges through the switch 115 and drives the switch 115 into the cut-off condition, hence, the switch 115 is opened. The capacitor 118 continues to discharge and applies a voltage in series with the Zener voltage across the terminals 63 and 124, to form a higher voltage pulse across the resistor 121. When the capacitor 118 is fully discharged, the higher voltage pulse decreases to zero as the capacitor 118 is recharged through the resistor 121 and the coil 117. The period in which the silicon controlled switch 115 is conductive is in the order of a few milliseconds, for example, so that the width of the initial voltage pulse appearing across the resistor 121 is independent of the temperature characteristics of the silicon controlled switch 115.

The voltage pulses across the resistor 121 are applied to a conductor 130 and to the network 37 in response to each pulse of the alternating voltage signal 24. The network 37 integrates the voltage pulses and produces the D.C. feedback voltage signal 35 having a level proportional to the frequency of the pulses of the alternating voltage signal 24 from the blocking oscillator 23. The D.C. feedback voltage signal 35 is fed over the feedback resistor 51 to the grid 54 so that the differential voltage is applied across the grid 54 and the filament 55. The capacitor 133 together with the feedback resistor 51 provide a time constant which is equal to the time constant of the antenna 11 for the same reasons as in the above-mentioned Kasemir patent.

The input impedance of the instrument 20 should be small compared to the atmospheric resistance between the air and the dipoles 14 and 41 so that the measured quantity is proportional to the short circuit current rather than to the open circuit voltage. Prior instruments which have used a fixed value resistor across the dipoles have required the resistance of such a resistor to be less than 1% of the atmospheric resistance, hence, a relatively high impedance, such as 10,000 megohms, exists across the dipoles. The resistor 51 may be of such value, but, because of the D.C. feedback voltage signal 35 which is developed by the feedback circuit 33, the effective input impedance of the measuring instrument 20 is reduced to 10 megohms, for example, rendering the instrument 20 capable of measuring the atmospheric air-earth current density at higher operational altitudes where the atmospheric resistance between the air and the dipoles 14 and 41 is lower. Further, by lowering the effective input impedance in this manner, longer dipoles 14 ad 41 may be used at high altitudes. The longer dipoles 14 and 41 have less resistance with respect to the air and provide greater differential voltage for operating the electrometer tube 57.

It is to be understood that the above-described arrangements are simply illustrative of an application of the principles of the present invention. Numerous other arrangements may be devised by those skilled in the art which will embody the principles of the present invention and will fall within the spirit and scope thereof.

What is claimed is:

1. In an instrument designed for atmospheric flight for measuring the current density in the atmosphere, wherein a dipole antenna is receptive to a current indicative of said current density, the improvement which comprises:
   first means responsive to said current for producing an alternating output signal having a frequency indicative of said current,
   said first means including a fixed value resistor across the terminals of said antenna,
   frequency-to-voltage converter means responsive to said alternating output signal for generating a feedback signal proportional to said frequency of said alternating voltage signal, and
   means for impressing said feedback signal on said resistor to reduce the effective resistance thereof and to render said instrument stable.

2. In an instrument designed for atmospheric flight for measuring the current density in the atmosphere, wherein a dipole antenna is provided for reception of a current indicative of said current density, said dipole antenna having an antenna-to-air resistance which decreases as the operating altitude of said instrument increases, the improvement which comprises:
   first means responsive to said current for producing an alternating output signal having a frequency indicative of said current,
   said first means including a fixed value resistor across the terminals of said antenna,
   frequency-to-voltage converter means responsive to said alternating output signal for generating a feedback signal proportional to said frequency of said alternating voltage signal, and
   means for applying said feedback signal to said resistor to reduce the effective resistance thereof to decrease the impedance of said instrument relative to said antenna-to-air resistance to permit said operating altitude of said instrument to be increased.

3. In an instrument designed for atmospheric flight for measuring the current density in the atmosphere, wherein a dipole antenna is provided for receiving a current indicative of said current density, said dipole antenna-to-air resistance which decreases as the operating altitude of said instrument increases, the improvement which comprises:
   a fixed value resistor across the terminals of said antenna;
   a two-stage electrometer amplifier having an input connected to said resistor and to one dipole of said dipole antenna for generating a first signal in response to said current received by said dipole antenna;
   a radiosonde transmitter including a blocking oscillator responsive to said first signal for producing a series of pulses forming an alternating output signal, the frequency of said alternating output signal being dependent upon said first signal;
   switch means rendered conductive by each of said pulses for producing a pair of feedback pulses;
   means for integrating said feedback pulses to produce a D.C. feedback signal indicative of the frequency of said alternating output signal; and
   means for applying said D.C. feedback signal to said resistor to decrease the effective impedance of said instrument relative to said antenna-to-air resistance to maximize said operating altitude of said instrument.

4. An improved instrument for measuring the current density in the atmosphere, which comprises:
   a pair of spaced, conductive elements for conducting a current in response to said current density;
   a fixed value resistor across the terminals of said elements;
   amplifier means including an electrometer amplifier responsive to said current for generating a first signal indicative of said current;
   means responsive to said first signal for producing an alternating output signal;
   means for converting said alternating output signal to a D.C. feedback signal; and means for applying said feedback signal to said resistor to render the response of said instrument to said current linear and stable.

5. An improved instrument in accordance with claim 4, wherein:
said electrometer amplifier includes an electrometer tube having a filament and a supply circuit for said filament, said supply circuit including current supply means and a solid-state device for regulating the current from said supply means to said filament.

6. In a measuring instrument designed for use with a radiosonde blocking oscillator and a dipole antenna receptive to a current indicative of the current density in the atmosphere, the improvement which comprises:
an electrometer amplifier responsive to said current for causing said radiosonde blocking oscillator to produce an output signal including a series of pulses, the frequency of said pulses being indicative of said current;
a feedback resistor connected to said amplifier;
switch means rendered conductive by each pulse of said series of pulses for generating a pair of voltage pulses;
a feedback circuit including an R-C network for integrating said pair of voltage pulses to develop a feedback signal; and
means for applying said feedback signal across said feedback resistor to said electrometer amplifier to stabilize said measuring instrument notwithstanding instabilities of said radiosonde blocking oscillator.

No references cited.

ROBERT L. GRIFFIN, *Primary Examiner.*

A. MAYER, *Assistant Examiner.*

U.S. Cl. X.R.

330—143